United States Patent [19]

Nash

[11] Patent Number: 4,958,848
[45] Date of Patent: Sep. 25, 1990

[54] PINTLE TYPE TRAILER COUPLING

[76] Inventor: Boyd B. Nash, 811 N. 51 Ave., Yakima, Wash. 98908

[21] Appl. No.: 345,282

[22] Filed: May 1, 1989

[51] Int. Cl.⁵ ............................................. B60D 1/00
[52] U.S. Cl. ................................... 280/509; 280/504; 280/508
[58] Field of Search ............... 280/504, 506, 507, 508, 280/509

[56] References Cited

U.S. PATENT DOCUMENTS

| | | | |
|---|---|---|---|
| 1,842,843 | 9/1931 | Staley . | |
| 2,429,761 | 10/1947 | Ketel | 280/33 |
| 2,700,555 | 1/1955 | Arend | 280/504 |
| 2,842,380 | 7/1958 | Weiss | 280/504 |
| 2,951,711 | 9/1960 | Karnath et al. | 280/508 |
| 3,204,985 | 9/1965 | Karnath et al. | 280/504 |
| 3,475,037 | 10/1969 | Weiss | 280/504 |
| 4,721,324 | 1/1988 | Blacklaw | 280/504 |
| 4,758,015 | 7/1988 | Pixley | 280/504 |

FOREIGN PATENT DOCUMENTS

| | | | |
|---|---|---|---|
| 1008123 | 5/1957 | Fed. Rep. of Germany | 280/508 |
| 1063909 | 8/1959 | Fed. Rep. of Germany | 280/508 |
| 1074411 | 1/1960 | Fed. Rep. of Germany | 280/508 |
| 1115135 | 10/1961 | Fed. Rep. of Germany | 280/508 |
| 1208199 | 12/1965 | Fed. Rep. of Germany | 280/508 |

Primary Examiner—Charles A. Marmor
Assistant Examiner—Alan M. Kagen
Attorney, Agent, or Firm—Eugene D. Farley

[57] ABSTRACT

A pintle hook type tractor-trailer coupling component for heavy duty use. Multiple detent and safety hook means are provided for maintaining it securely, but releasably, in its operative position, coupled to the eye component of a pulling truck or tractor. Automatic take-up means assure a snug fit between the hook and the eye, irrespective of wear.

6 Claims, 3 Drawing Sheets

PINTLE TYPE TRAILER COUPLING

This invention relates to pintle type trailer couplings of the class intended particularly for heavy duty use in the releasable coupling of a trailer to a towing truck or tractor.

BACKGROUND AND GENERAL STATEMENT OF THE INVENTION

With the development and ever increasing highway use of large tractor-trailer combinations, it has become increasingly important to provide heavy duty couplings having safety locks insuring against inadvertent or accidental release of the trailer on the highways, a condition to be avoided at all costs. It is the general purpose of the present invention to provide such a coupling.

It is a further important object of the present invention to provide a pintle type trailer coupling provided with an automatic take-up for adjusting for hook and eye wear in order to prevent the development of a loose, sloppy fit between these two important components of the coupling.

Other important objects of the present invention are the provision of a pintle-type trailer coupling which is:

Particularly suited for use with dual drawbar trailer units.

Easy to couple and uncouple even though there is a load pulling against the pintle.

Easily mounted on the tailboard of the truck.

Shielded against entry of ice and snow in the winter, thus minimizing rusting of the moving parts of the coupling.

Easy to repair by replacement of worn or broken parts.

Easy to back into during the coupling operation.

The foregoing and other objects of the invention are provided by the provision of a truck-trailer coupling assembly comprising a truck-mounted housing having a pivotally mounted pintle hook for coupling to a cooperating eye mounted on the trailer.

The pintle hook is shiftable between open and closed positions. It is provided with a radially extending arm having a stop surface.

A first detent is pivotally mounted on the housing a spaced distance from the pintle hook. It is shiftable between an advanced position, wherein the pintle hook is closed, and a retracted position, wherein the pintle hook is open. It has a stop surface in abutting contact with the stop surface of the pintle hook arm when the pintle hook is in its closed position and the first detent is in advanced position. It also has an associated operating lever overlying the pintle hook body.

Resilient means bias the lever and associated first detent toward their advanced positions.

Cam means mounted in the housing between the pintle hook body and the lever cooperate with the resilient means in shifting the lever and associated first detent between their advanced and retracted positions, thereby permitting shifting of the pintle hook between its open and closed positions as required for the coupling and uncoupling operations.

THE DRAWINGS

DETAILED DESCRIPTION OF A PREFERRED EMBODIMENT OF THE INVENTION

Figure 1:
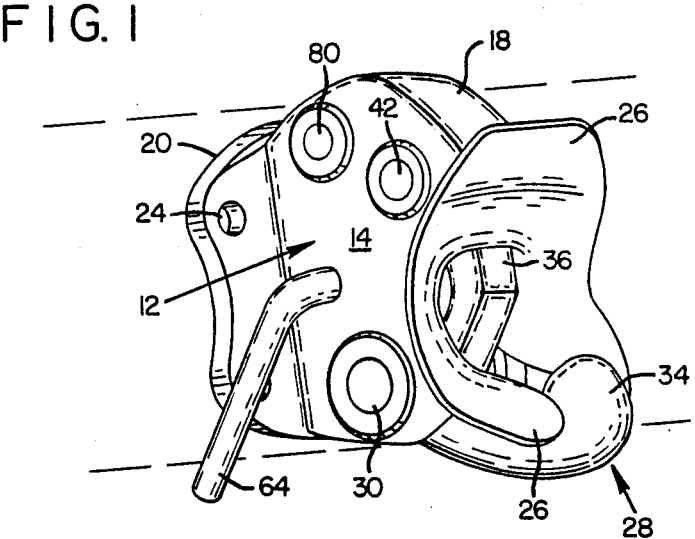
FIG. 1 is a perspective view of the pintle hook component of the herein described trailer coupling, viewed from the rear with reference to the truck on which it is mounted.

The trailer coupling of the present invention is designed for use with a truck-mounted pintle hook component and a cooperating eye component 10 with which the drawbar or tongue of the associated trailer is provided.

The pintle hook component is contained in a housing indicated generally at 12. It is a strong, heavy duty component which may to advantage be fabricated from cast steel, heat-treated in spots of extreme wear. It has a left side 14, a right side 16, a top 18, and a flanged front face plate 20 (with reference to the truck). Front face plate 20 has an opening 22 to provide access to the interior. It also has bolt holes 24 by means of which the coupling is attached to the truck.

On the opposite face of the housing, outwardly flaring flanges 26 provide guiding surfaces for guiding eye 10 into operative engagement with the pintle hook component of the hitch as the truck is backed into the trailer. They define an opening which, together with an open housing bottom, affords clearance for operation of the pintle hook component of the coupling assembly, indicated generally at 28.

Figure 3:
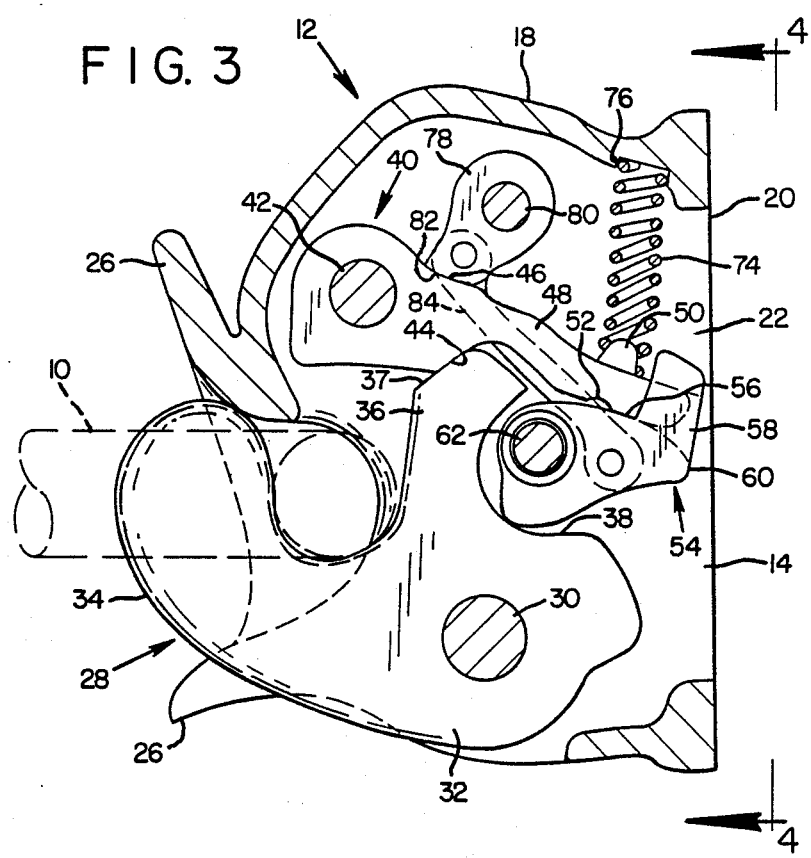
FIG. 3 is a longitudinal sectional view of the pintle hook component.
Figure 5:
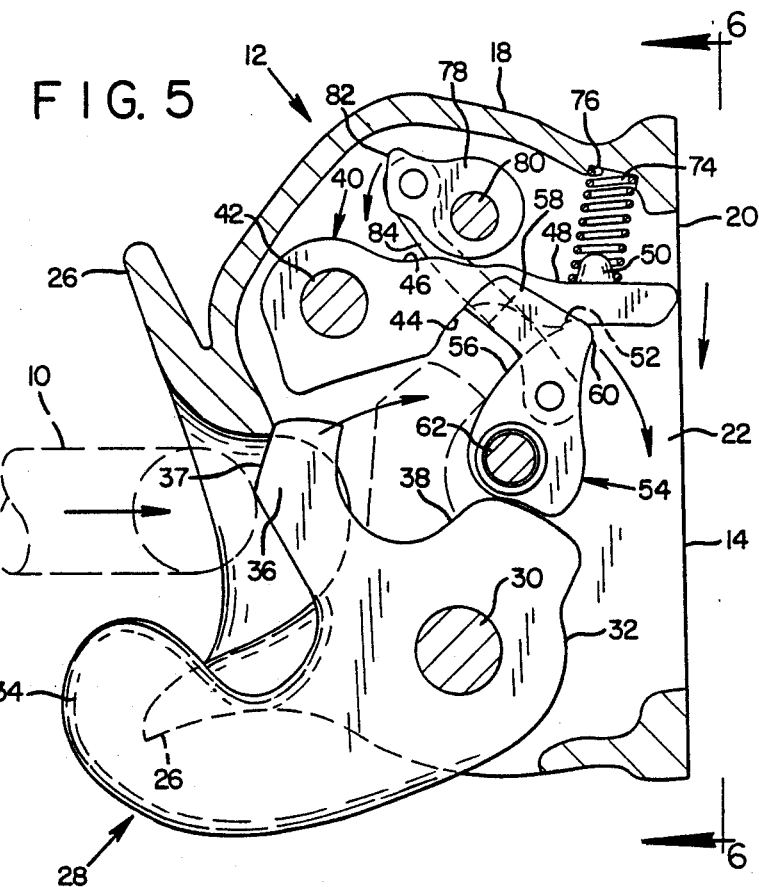
FIG. 5 is a longitudinal sectional view of the pintle hook component, similar to FIG. 3, but with the pintle hook in its open, idle position.

As seen particularly in FIGS. 3 and 5, pintle hook 28 is mounted pivotally between housing side walls 14 and 16 by means of a pivot pin 30. The hook comprises a body portion 32, a hook portion 34 and a radially extending operating arm 36. The latter extends generally upwardly, and, together with body portion 32, forms a recess 38.

Arm 36 is provided on its upper outer surface with a stop or abutment surface 37.

As will be seen by a comparison of FIGS. 3 and 5, the pintle hook is shiftable between the open position of FIG. 5 and the closed position of FIG. 3. It is maintained in the closed position by a first detent, indicated generally at 40, mounted on a pivot pin 42 extending between the side walls of the housing.

First detent 40 is provided on its underside with a lower stop or abutment surface 44 and on its upper side with an upper stop or abutment surface 46. The former cooperates with stop surface 37 on hook arm 36; the latter, with a second detent to be described.

First detent 40 is pivotally mounted on the housing a spaced distance from pintle hook body 32. It is contoured with an integral operating lever 48 which overlies pintle arm 36 and pintle body recess 38. The lever has on its upper surface a spring-retaining nub 50 and, on its under surface, a notch 52.

First detent 40 is shiftable in its pivot pin mounting 42 between the advanced position of FIG. 3, wherein stop surface 37 on pintle arm 36 abuts stop surface 44 on first detent 40, and the retracted position of FIG. 5, wherein the two stop surfaces are separated. The drive employed for this purpose comprises a cam 54 mounted in recess 38 and having an arcuate cam surface 56 which engages the underside of lever 48.

A catch 58 extending upwardly from one side of cam 40 is configured and dimensioned to overlie and engage the upper terminal surface of lever 48 when detent 40 is in its advanced FIG. 3 position.

The outer terminal portion of cam 54 is pointed to provide a pawl 60. This is dimensioned and contoured to enter notch 52 on the underside of lever 48 when the lever, and first detent, are in their retracted positions of FIG. 5.

Cam 54 is mounted on cam shaft 62 by means of a pin 63, and is driven by means of a cam shaft 62 which terminates in an operating handle 64. The cam shaft is slidably mounted, in the axial direction, between housing side walls 14, 16.

Means are provided for locking catch 58 in operative engagement with lever 48 when the hook 28 is in its FIG. 3 closed position.

Figure 2:
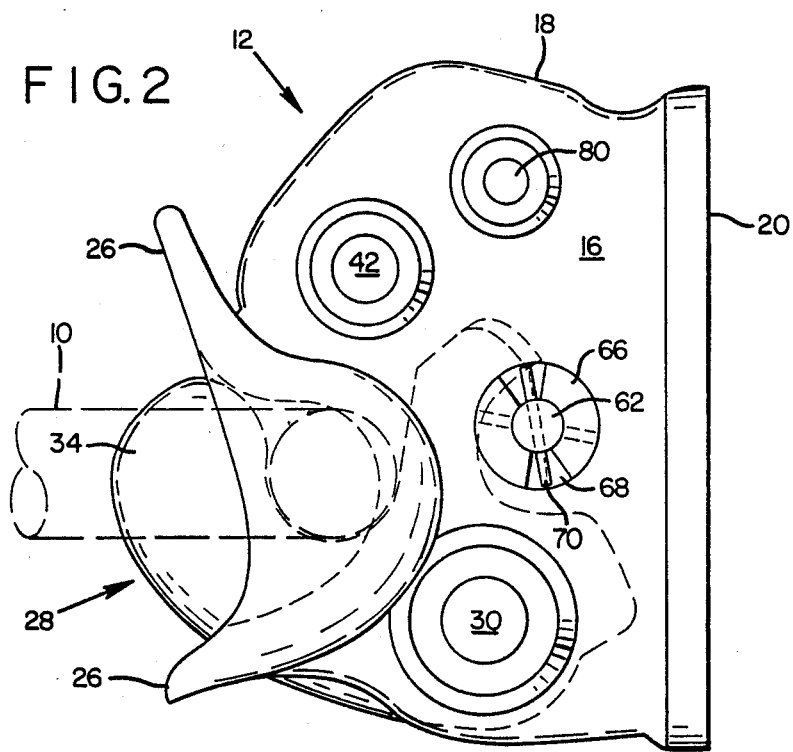
FIG. 2 is a view in side elevation of the pintle hook component in its operating position, coupled to its cooperating eye component.

To accomplish this purpose, there is provided on the exterior surface of housing side wall 16 a boss 66 having a radial socket 68, FIG. 2. A pin 70 removably penetrates the end of cam shaft 62. It seats in socket 68 when hook 28 is in its working position of FIG. 3.

A compression type coil spring 72 encircles cam shaft 62, bearing at one end against the inner surface of housing side wall 16 and at the other end against the side wall of cam 54. Its action is such as to maintain catch 58 in operative engagement with the upper surface of lever 48 when hook 28 is in its working position. However, by moving cam shaft 62 axially, to the left as viewed in FIGS. 3 and 5, pin 70 may be removed from socket 68, releasing catch 58 so that cam 54 may be operated.

Figure 4:
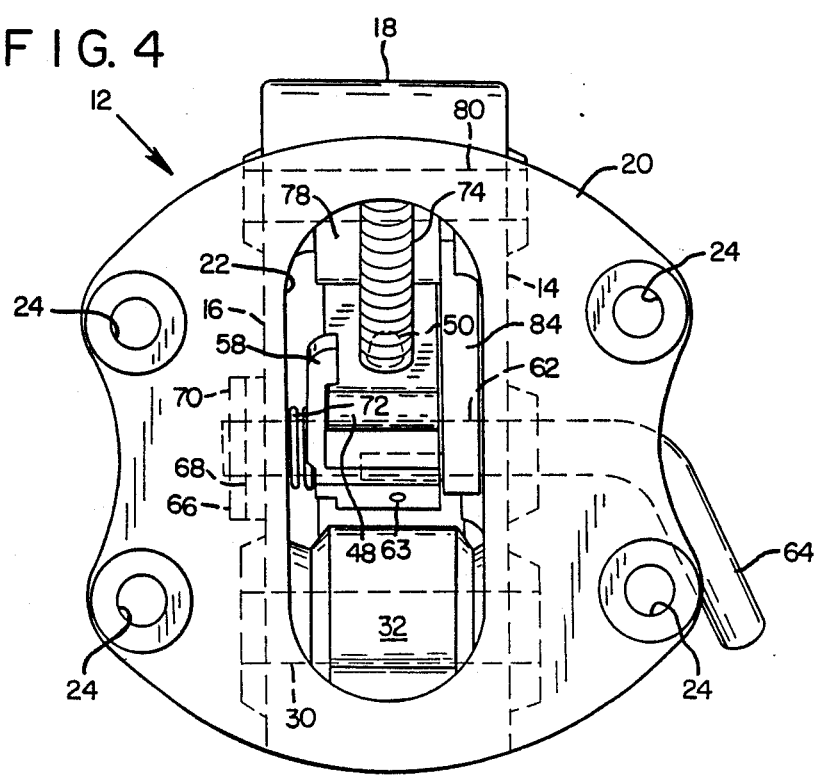
FIG. 4 is a view in elevation, looking in the direction of the arrows of line 4—4 of FIG. 3 of the pintle hook component, with the pintle hook in its closed, or working, position.

Means also are provided for biasing lever 48 toward its advanced position in order to maintain the elements of the assembly in their hook-locking positions of FIGS. 3 and 4.

The means provided for this purpose comprise a stout, compression-type coil spring 74 interposed between the upper surface of the lever and the inner surface of housing top 18. One end of the spring is mounted on retaining nub 50 on the upper surface of the lever. The other is seated in a recess 76 on the inner surface of the housing top.

It will be apparent that first detent 40 and catch 58 provide safety appliances for preventing inadvertent opening of pintle hook 28. Further to insure that this undesired result does not occur, second detent means are provided for preventing shifting of the position of the first detent 40 to its retracted position.

For this purpose a second detent 78 is pivotally mounted on a shaft 80 extending between the side walls of the housing. The second detent has a stop or abutment surface 82 positioned to cooperate with stop surface 46 on the first detent.

Second detent 78 is actuated by means of a link 84, one end of which is pivotally connected to second detent 78 and the other end of which is pivotally connected to cam 54. Operation of the cam accordingly not only shifts the position of lever 48, operating first detent 40; it also drives second detent 78 between its operative and inoperative positions.

OPERATION

The operation of the herein described trailer coupling assembly is as follows.

Figure 6:
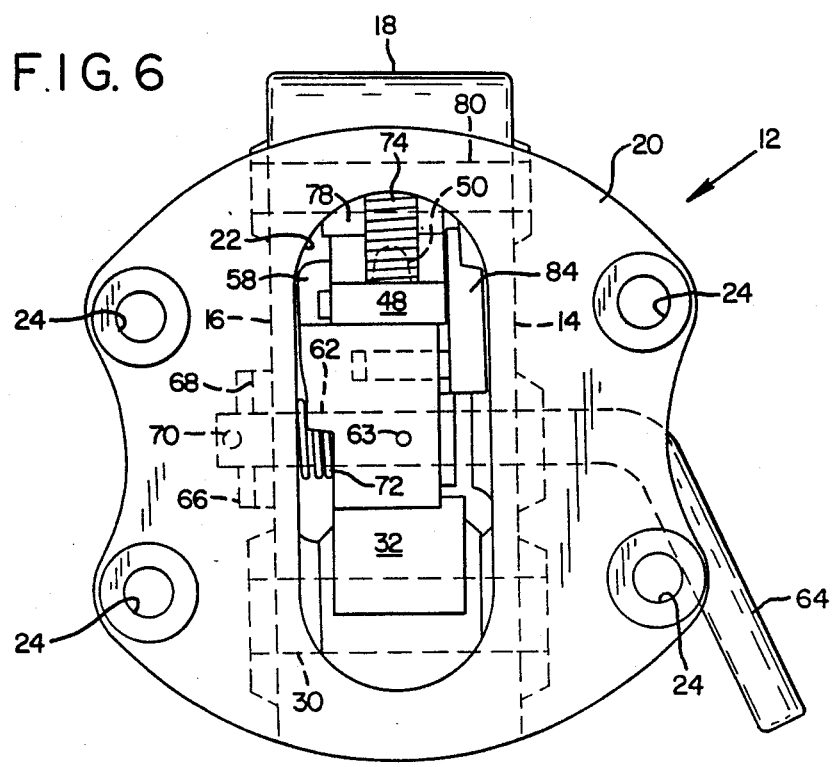
FIG. 6 is a view in elevation looking in the direction of the arrows of line 6—6 of FIG. 5.

Assuming that it is desired to couple a trailer equipped with a drawbar or tongue mounting coupling eye 10 to a truck mounting a cooperating pintle hook 28:

With the hitch assembly in its open FIGS. 5 and 6 condition, the truck is backed toward the trailer until eye 10 contacts arm 36 of pitle hook assembly 28. This will cause the assembly to snap from its open FIGS. 5 and 6 condition to its closed FIGS. 3 and 4 condition, the motive force being the action of compression spring 74.

In the latter condition of the assembly, hook 28 is securely received in working relationship to eye 10 and locked therein by a plurality of safety devices.

Stop surface 37 of hook arm 36 abuts stop surface 44 of first detent 40.

Stop surface 46 of first detent 40 abuts against stop surface 82 of second detent 78.

Compression spring 74 urges both detents into their operative positions.

In the event of failure of this spring, catch 58 maintains lever 48, and hence both detents, in their operative positions.

Pin 70, maintained in slot 68 by the action of spring 72, further prevents inadvertent operation of cam 54, thereby preventing also inadvertent release of the double detent combination.

Four-way assurance thus is provided against inadvertent release of pintle hook 28. In the event of failure of one or more of the safety units, the remaining members of the assembly will act to prevent malfunction.

At the conclusion of the journey, the hook may be released by a simple, one-handed operation even though load still is applied by eye 10 against hook 28.

Release is accomplished by pushing inwardly on handle 64 to shift safety catch 58 from its FIGS. 3 and 4 position, thereby releasing cam 54. Rotation of the handle then will operate the cam which, in turn, will elevate and release first detent 40 through the action of associated lever 48. Through the action of link 84 it also will shift second detent 78 to its inoperative position. Hook 28 thereupon will be released and drop gravitationally to its inoperative FIGS. 5 and 6 position.

It is to be noted that the operation of cam 54 is against the force of compression spring 74, so that at the conclusion of the hook release operation the spring is in its compressed, FIG. 5 condition. It is releasably locked in this position by the entrance of pawl 60 into notch 52 on the underside of lever 48. There it is maintained in a releasable condition, ready for the next operation of the hook assembly.

It is further to be noted that stop surfaces 37, 44 are sloping and angularly arranged to form a "ramp" so that they adjustably position relative to each other. In view of the force provided by compression spring 74, this provides an automatic "take-up" which causes hook 34 to engage eye 10 snugly no matter whether wear occurs between these two members (as time goes on). A snug fit always is assured during the life of the assembly.

Having thus described in detail a preferred embodiment of the present invention, it will be apparent to those skilled in the art that various physical changes may be made in the invention described herein without altering the inventive concepts and principles embodied. The present embodiment is therefore to be considered as illustrative and not restrictive, the scope of the invention being indicated by the appended claims.

I claim:

1. A trailer coupling component comprising:
   (a) a housing,
   (b) a pintle hook pivotally mounted in the housing and extending outwardly for coupling to a cooperating eye mounted on a towing vehicle,
   (c) the pintle hook being shiftable between open and closed positions and having a body portion, a hook portion and a radially extending arm portion having a stop surface,
   (d) a first detent pivotally mounted on the housing a spaced distance from the pintle hook body portion and shiftable between an advanced position when the pintle hook is closed, and a retracted position when the pintle hook is open,
   (e) the first detent having a body portion having a stop surface in abutting contact with the stop surface of the pintle hook arm when the pintle hook is in its closed position and the first detent is in its advanced position,
   (f) the first detent having also an associated operating lever adjacent the pintle hook body,
   (g) resilient means biasing the lever toward the advanced position of the first detent, and
   (h) cam means mounted in the housing between the pintle hook body and the lever and, coacting with the resilient means, operable to shift the lever and associated first detent between their advanced and retracted positions, the cam means comprising a cam shaft rotatably mounted on the housing, and a cam body mounted on the cam shaft and having a cam surface in camming engagement with the adjacent surface of the lever, the cam shaft being axially slidable with reference to the housing and including lock means on the cam shaft for locking the cam means in the advanced position of the first detent.

2. The trailer coupling component of claim 1 wherein the lock means comprises pin and socket lock means.

3. The trailer coupling component of claim 1 including catch means on the cam means configured and dimensioned to overlie the lever and to retain the same when the first detent is in its advanced position, and to release the same for moving the first detent to its retracted position.

4. A trailer coupling component comprising:
   (a) a housing,
   (b) a pintle hook pivotally mounted in the housing for coupling to a cooperating eye mounted on a towing vehicle,
   (c) the pintle hook being shiftable between open and closed positions and having a body portion, a hook portion and a radially extending arm portion having a stop surface,
   (d) a first detent pivotally mounted on the housing a spaced distance from the pintle hook body and shiftable between an advanced position when the pintle hook is closed, and a retracted position when the pintle hook is open,
   (e) the first detent having a body portion having a stop surface in abutting contact with the stop surface of the pintle hook arm when the pintle hook is in its closed position and the first detent is in its advanced position,
   (f) the first detent having also as associated operating lever adjacent the pintle hook body,
   (g) resilient means biasing the lever toward the advanced position of the first detent,
   (h) cam means mounted in the housing between the pintle hook body and the lever and, coacting with the resilient means, operable to shift the lever and associated first detent between their advanced and retracted position,
   (i) the cam means comprising a cam shaft rotatably mounted on the housing, and a cam body mounted on the cam shaft and having a cam surface in camming engagement with the adjacent surface of the lever,
   (j) the cam shaft being axially slidable with reference to the housing and including lock means for locking the cam means in the advanced position of the first detent,
   (k) catch means on the cam means configured and dimensioned to overlie the lever and to retain the same when the first detent is in its advanced position, and to release the same for moving the first detent to its retracted position,
   (l) second detent means pivotally mounted in the housing a spaced distance from the first detent means, and drive means connected to and operable by the cam means for shifting the second detent means into operative engagement with the first detent means when the first detent means is moved to its advanced position, and for retracting it therefrom when moving the first detent means to its retracted position,
   (m) the drive means for the second detent means comprising link means interconnecting the cam means and the second detent means.

5. A trailer coupling component comprising:
   (a) a housing,
   (b) a pintle hook pivotally mounted in the housing and extending outwardly for coupling to a cooperating eye mounted on a towing vehicle,
   (c) the pintle hook being shiftable between open and closed positions and having a body portion, a hook portion and a radially extending arm portion having a stop surface,
   (d) a first detent pivotally mounted on the housing a spaced distance from the pintle hook body portion and shiftable between an advanced position when the pintle hook is closed, and a retracted position when the pintle hook is open,
   (e) the first detent having a body portion having a stop surface in abutting contact with the stop surface of the pintle hook arm when the pintle hook is in its closed position and the first detent is in its advanced position,
   (f) the first detent having also an associated operating lever adjacent the pintle hook body,
   (g) resilient means biasing the lever toward the advanced position of the first detent,
   (h) cam means mounted in the housing between the pintle hook body and the lever and, coacting with the resilient means, operable to shift the lever and associated first detent between their advanced and retracted positions,
   (i) second detent means pivotally mounted in the housing a spaced distance from the first detent means, and
   (j) drive means connected to and operable by the cam means for shifting the second detent means into operative engagement with the first detent means when the first detent means is moved to its advanced position, and for retracting it therefrom when moving the first detent means to its retracted position, wherein said drive means for the second detent means comprises link means interconnecting the cam means and the second detent means.

6. The trailer coupling component of claim 5 wherein the cam means is provided with a pawl and the undersurface of the operating lever of the first detent is provided with a cooperating notch positioned for entering and releasable retention of the pawl when the pintle hook is in its open position.

* * * * *